United States Patent

Pilato

[15] 3,671,730

[45] June 20, 1972

[54] ELECTRONIC DEVICE FOR PLANE GRAPHICAL REPRESENTATION WITH PERSPECTIVE EFFECT

[72] Inventor: Maurice J. M. Pilato, Paris, France

[73] Assignee: Marc Norbert Collet, Paris, France

[22] Filed: March 30, 1970

[21] Appl. No.: 23,659

[30] Foreign Application Priority Data

March 24, 1969 France ..................................6908571

[52] U.S. Cl. ..................................235/189, 33/1 K, 33/1 M, 33/18 C, 33/20 C, 235/151, 235/197, 343/7.9

[51] Int. Cl. ........................................G06g 7/04, G06g 7/26

[58] Field of Search ...............235/189, 197, 150.53, 151 PL; 33/1 K, 1 M, 18 C, 20 C; 343/7.9

[56] References Cited

UNITED STATES PATENTS

| | | | |
|---|---|---|---|
| 3,465,135 | 9/1969 | Belsterling et al. | 235/189 |
| 3,145,474 | 8/1964 | Taylor | 235/151 PL |
| 3,422,537 | 1/1969 | Dewey et al. | 235/151 PL UX |
| 3,519,997 | 7/1970 | Bernhart et al | 235/151 PL X |
| 2,578,970 | 12/1951 | Gannaway | 343/7.9 X |
| 2,648,061 | 8/1953 | Parker et al. | 343/7.9 |

*Primary Examiner*—Eugene G. Botz
*Assistant Examiner*—R. Stephen Dildine, Jr.
*Attorney*—Breitenfeld & Levine

[57] ABSTRACT

The present invention concerns an electronic device supplying a plane graphical representation with perspective effect of three voltages.

An electronic device comprising three electrical signal input channels denoted by X, Y and Z, a signal distributor receiving electrical signals denoted by x, y and z supplied respectively by the three channels X, Y and Z and supplying electrically signals a and b to two channels respectively denoted by A and B, the function of the signal distributor to amplify and combine the electrical signals $x$, $y$ and $z$ supplied to it for supplying to the channel A a signal $a = k{\cdot}x + m{\cdot}z$ and for supplying to the channel b a signal $b = l{\cdot}y + n{\cdot}z$, the amplification factors $k$, $l$, $m$ and $n$ being independent of each other and negative or positive.

Generally, the invention is applied to the representation of any quantities which can be translated into electrical signals, the variations of some of which as are functions of the other it is useful to know.

15 Claims, 11 Drawing Figures

INVENTOR:
MAURICE J.M. PILATO
By
Breitenfeld & Levine
ATTORNEYS

INVENTOR:
MAURICE J. M. PILATO
BY
Breitenfeld & Levine
ATTORNEYS

INVENTOR:
MAURICE J. M. PILATO
By Breitenfeld & Levine
ATTORNEYS

INVENTOR:
MAURICE J. M. PILATI
By
Breitenfeld & Levine
ATTORNEYS

INVENTOR:
MAURICE J. M. PILAT
BY
Breitenfeld & Levine
ATTORNEYS

INVENTOR:
MAURICE J. M. PILATO
BY
Breitenfeld & Levine
ATTORNEYS

ELECTRONIC DEVICE FOR PLANE GRAPHICAL REPRESENTATION WITH PERSPECTIVE EFFECT

This invention concerns an electronic device comprising a curve tracer and supplying a plane graphical representation with perspective effect of three voltages.

The plane graphical representation of two voltages, as a function of one another, is currently used for visualizing the concomitant variations of these voltages; the devices most often used for this purpose are the cathode ray oscillograph and the tracing table, and the applications of graphical representation include the study and control of all physical and chemical systems, in which at least two parameters may be expressed in the form of voltages by means of suitable pick-ups. The examples of such applications are so numerous that as characteristic examples, reference will be made merely to stress-strain diagrams in mechanics, polarographic diagrams in electrochemistry and electrocardiographic and electroencaphalographic diagrams in medicine.

However valuable these diagrams may be, they do not permit the study of three-parameter systems otherwise than by the comparison of successive diagrams. Expedients have been conceived and are known for facilitating this comparison; thus, in the case of the cathode ray oscillograph, the process of electronic switching or the use of oscillographs having a plurality of cathode rays for causing a plurality of superimposed diagrams to appear in the same representation plane. Hitherto, the three-parameter graphical representation, known by mathematicians, architects and more generally all industrial or artistic draftsmen by the name of perspective representation, has not been possible by means of a simple electronic device; only a very complicated device comprising a computer and a cathode ray scanning screen of television type has recently provided an acceptable but costly solution of this problem.

This invention proposes to provide a simple electronic solution of the problem of three-parameter plane graphical representation. It also proposes to provide novel forms of graphical representation for improving the visualization of the evolution of parameters as a function of each other.

For this purpose, the device according to the invention shown in FIG. 1, which will be described more fully below, is an electronic device comprising three electrical signal input channels denoted by X,Y and Z, a signal distributor receiving electrical signals denoted by $x$,$y$ and $z$, supplied respectively by the three channels X,Y and Z and supplying electrical signals denoted by $a$ and $b$ by channels A and B, and a curve tracer receiving the electrical signals $a$ and $b$ by the channels A and B and supplying a graphical representation in cartesian co-ordinates of these signals, the signal distributor having the function of amplifying and combining the electrical signals $x$, $y$ and $z$ supplied to it for supplying on the channel A a signal $a = k\cdot x + m\cdot z$ and supplying on the channel B a signal $b = l\cdot y + n\cdot z$, the amplification coefficients $k$, $l$, $m$ and $n$ being independent of each other and positive or negative, such that the curve tracer provides a graphical representation of the three electrical signals $x$, $y$ and $z$ carried by the input channels X, Y and Z of the device.

The aforesaid device may be fed with any electrical signals $x$,$y$,$z$ compatible with the pass-band of the device. Depending on the requirements, these signals may be continuous or slowly variable voltages, alternating voltages limited to the upper frequency of the pass-band, or again any signals which may be split up into a sum of the aforesaid simple signals, in particular alternating signals of modulated amplitude. These signals may correspond to electrical quantities or other physical, chemical, optical and the like quantities, converted into electrical quantities by means of suitable pick-ups.

The signal distributor comprises substantially two identical differential amplifiers and a distributing device, each differential amplifier comprising a pair of symmetrical input channels and one output channel, the distributing device comprising one input channel and a pair of output channels, each of the output channels of the distributing device corresponding to one of the two differential amplifiers and being connected to one of the input channels of this amplifier.

The differential amplifiers will be denoted by AD and BD, their output channels being denoted respectively by A and B, and their input channels being denoted respectively by $U_A$, $V_A$ and by $U_B$, $V_B$. The distributing device will be denoted by RE, its input channel by R and the two output channels of the device RE will be denoted by P and Q.

According to one embodiment of the signal distributor, the output channel P of the distributing device RE is connected to the input channel $V_A$ of the differential amplifier AD, and the output channel Q of the distributing device RE is connected to the input channel $V_B$ of the amplifier BD.

As modification, P may be connected to $U_A$ and/or Q may be connected to $U_B$, or again P may be connected either to $U_B$ or to $V_B$, Q being then connected either to $U_A$ or to $V_A$.

In every case, the signal distributor comprises three free input channels, namely the input channel R of the distributing device and one of the channels of each of the differential amplifiers AD and BD.

According to one embodiment of the device according to the invention, each of the three input channels X, Y and Z of the said device is connected to one of the three input channels of the signal distributor. For example, the channel X is connected to the channel $U_A$, the channel Y to the channel $U_B$ and the channel Z to the channel R. All the other combinations taken two at a time of the three input channels X, Y and Z with the three input channels of the signal distributor are, however, equally possible.

On all the channels mentioned, there may be provided amplifiers or attenuators for modifying the signals carried by these channels, all these amplifiers and/or attenuators having merely to satisfy the condition that the delays which they inevitably apply to the signals are strictly equivalent, regardless of the input channel X, Y and Z and regardless of the output channel A or B of the said signals.

The distributing device RE has the function of supplying to each of its output channels P and Q a signal proportional to the signal which it receives on its input channel R, these signals being denoted respectively by $p$, $q$ and $r$.

According to a first embodiment of the distributing device RE, this device comprises a single interconnection junction of the channels R, P and Q. Under these conditions, the signals $p$, $q$ and $r$ are equal.

According to another embodiment of the distributing device RE, this device comprises two identical slider-potentiometers, connected in parallel by their two ends, the input channel R corresponding to one of the ends common to the two potentiometers and to one of the sliders, the output channel Q corresponding to the same slider and to the other of the ends common to the two potentiometers, the slider common to the channels P, Q and R being preferably connected to the earth of the device, and the two sliders being advantageously coupled together for simultaneous operation; each in appropriate direction, either manually or mechanically. In this embodiment, the locus of a given value of $r$ on the graphical representation is a straight line intersecting the axis of the abscissae and the axis of the ordinates, the point representing this value $r$ describing a segment of this straight line as a function of the position of the potentiometer sliders.

According to another embodiment of the distributing device RE, this device comprises a transformer comprising at least one primary winding and at least two secondary windings, the input channel R supplying an alternating signal $r$ to one at least of the primary windings, and two at least of the secondary windings supplying alternating signals $p$ and $q$ to the output channels P AND Q. The phase relations between the signals $p$, $q$ and $r$ may be any whatsoever and possibly variable, as in an induction regulator, by variation of the relative arrangement of the primary windings and secondary windings, one of the winding sets being movable mechanically relative to the other in translation or rotation.

Advantageously such a variable phase relation transformer may be provided by a selsyn, one winding of whose rotor serves as primary winding, the phase displacement between the signals $p$ and $q$ being controlled by the mutual arrangement of the secondary windings, and the phase displacement of the signals $p$ and $q$ relative to the signal $r$ being controlled by the angular rotation of the primary winding relative to the secondary windings. This angular position may be fixed or vary as required by manual or motor action on the selsyn rotor.

Preferably, the signals $p$ and $q$ are equal in absolute value and are in phase quadrature. In the case of a two-phase selsyn, it is possible for this purpose to connect each of the two windings of the stator to one of the output channels P and Q, the single winding of the rotor being connected to the input channel R. In the case of a three-phase selsyn, the same result may be obtained by connecting one of the stator windings to one of the output channels and connecting the other output channel to the end terminals of the other two stator windings connected in series, an attenuator possibly having the function of rendering equal in absolute value the two signals thus obtained on the output channels of the distributing device.

In this embodiment, the locus of a given value of the maximum amplitude of r in the graphical representation is an ellipse having the axis of the abscissae and the axis of the ordinates an axes, and the point representing this peak value of $r$ describes an arc of this ellipse as a function of the position of the selsyn rotor. Of course, the said ellipse may be reduced to a perfect circle with suitable choice of the amplification factors on the channels A and B or P and Q.

As a modification, it is possible to use a three-phase selsyn having two orthogonal windings carried by the rotor. In this case, there is the possibility of representing not only one signal $r$, but two signals $r'$ and $r''$ the two graphical representations being superimposed and rotated relative to one another through 90°about the center of the ellipse.

To put the explanations in more concrete form, assuming that the input channels X and Y are connected respectively to the input channels $U_A$ and $V_B$ of the differential amplifiers AD and BD, and that the input channel Z is connected to the input channel R of the distributing device RE, whose output channels P and Q are connected respectively to the input channels $V_A$ and $U_B$ of the differential amplifiers AD and BD, the whole of the device according to the invention permits the following results to be obtained:

In the absence of signal $z$ on channel Z, the signals on channels $V_A$ and $U_B$ are zero and channels A and B supply respectively the signals $a = k{\cdot}x$ and $b = l{\cdot}y$ to the curve tracing device which represents these signals as abscissae and ordinates of the diagram.

In the absence of signals $x$ and $y$ on channels X and Y, the signals on channels $U_A$ and $V_B$ are zero and channels A and B supply respectively the signals $a = m{\cdot}z$ and $b = n{\cdot}z$ to the curve tracing device, which represents these signals graphically as abscissae and ordinates. The signal $z$ is represented as if it had been assigned a special co-ordinate axis, oblique relative to the axes of the abscissae and co-ordinates of the diagram.

When the three signals $x$, $y$ and $z$ are present, the device according to the invention supplies respectively the signals $a = k{\cdot}x + m{\cdot}z$ and $b = l{\cdot}y + n{\cdot}z$ to the curve tracer, which, due to this fact, represents the set of three signals graphically according to the laws of perspective called isometric projection.

As a modification it is possible to modulate the gain of amplifiers arranged on channels A and B as a function of the amplitude of signal $r$. The scale of representation thus becomes a function of the amplitude of signal $r$ which, with suitable direction of the scale variable makes it possible to produce a representation in artistic perspective with horizon line and vanishing points.

The device according to the invention therefore makes it possible to represent according to three co-ordinate axes, in isometric or artistic perspective, three parameters of any phenomenon, when these parameters can be translated into electrical quantities by an appropriate pickup system. As non-restrictive examples, the phenomena capable of being represented in this way may be in the domain of physiology (electrocardiography, electroencephalography), mechanics (stress analysis, trajectography), chemistry (polarography of an evolutive system). A particularly interesting example is the graphical representation in isometric perspective of the three characteristic parameters of a transistor or a thyristor, the overall character of this representation permitting an entire study of the evolution of the properties of these devices as a function of temperature, frequency, accelerated ageing and so forth.

Of course, all the complementary techniques perfected for the use of cathode ray oscillographs of conventional type may enrich the possibilities of diagrammatic representation provided by the device according to the invention, inter alia by representation of a supplementary parameter by modulation of the brilliance, displacement of the co-ordinate axes as a function of time, simultaneous representation of a number of figures by electronic switching, representation of recurrent phenomena in polar co-ordinates by means of annular modulators, improved visualization by representation of modulated carrier signals.

This last means consists substantially in representing a quantity not by the electrical signal corresponding to it, but by the amplitude of the modulation of a stable electrical signal supplied at a much higher frequency than that of the signals studies. In a conventional two dimensional plane representation, there is thus caused to correspond to the absence of studied signal a figure in the form of a rectangle having rectilinar sides, the presence of the studied signals deforming these sides and transforming the figure into a curvilinear quadrilateral. In the representation of three parameters according to the invention, the absence of signals corresponds to a figure in the form of a rectangular parallelipided seen in perspective, the signals modulating the faces and edges of this parallelipiped so as to cause to appear, seen in perspective, a hexahedron having skew surfaces and curvilinear edges. One of the interests of this representation resides in the fact that the eye appreciates better the small variations of signals in this form, and that also, in this case, the position of a point relative to the position of the reference trihedron (co-ordinate axes) is visualized better.

The following description and accompanying drawings, given as non-restrictive example, will explain better how the invention is to be carried into effect. I In the accompanying drawings:

FIG. 1 shown a basic circuit diagram of the invention;

FIG. 2 shown an electric circuit diagram of a first embodiment of the distributing device RE;

Figure 1:
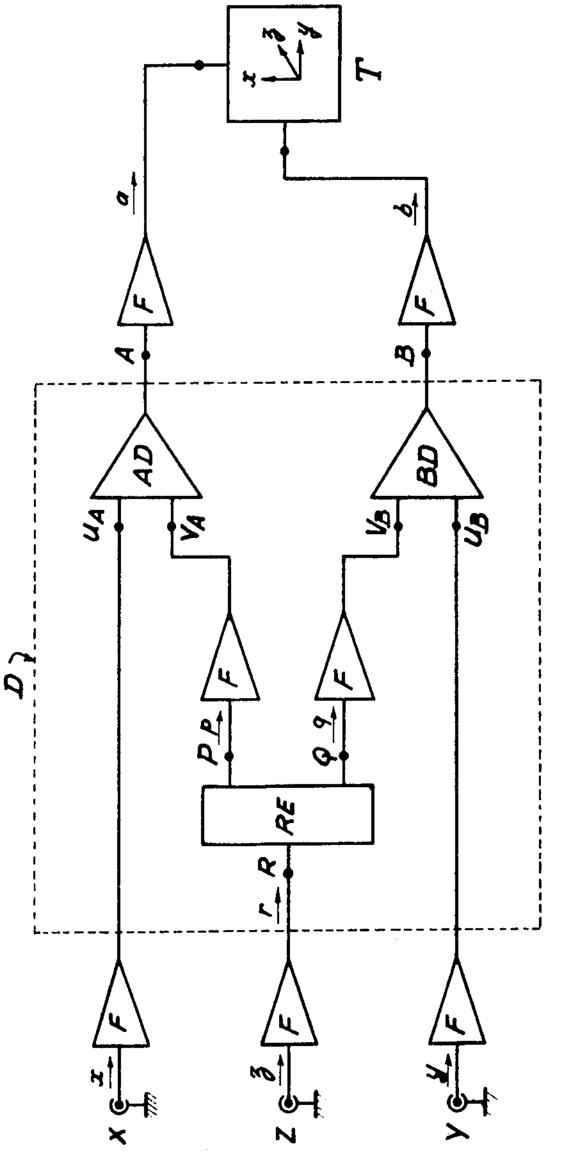

In FIG. 1, showing a basic circuit diagram of the device according to the invention, this device comprises three input channels denoted respectively by X, Y and Z delivering to a signal distributor, denoted as a whole by D, three electrical signals denoted by $x$,$y$,$z$, possibly amplified or attenuated by the devices F. In what follows, these devices F will be referred to generally as "attenuators." The output of the signal distributor D comprises two channels A and B.supplying signals $a$ and $b$, possibly modified by the respective attenuators F, to a curve tracer T, preferably a cathode ray oscillograph.

The signal distributor D comprises two identical differential amplifiers AD and BD, a distributing device RE and possibly two attenuators F. The differential amplifiers AD and BD each comprise two input channels, denoted respectively by $U_A$, $V_A$ and by $U_B$, $V_B$, as well as an output channel denoted respectively by A and B. The distributing device RE comprises an input channel R and two output channels P and Q, carrying respectively the signals $r$, $p$ and $q$.

Figure 2:
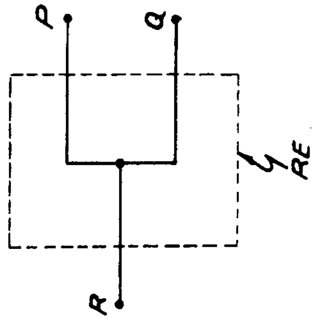

A first embodiment of the distributing device RE, shown in FIG. 2, consists in connecting together the channels P, Q and R of this device. The three signals $p$, $q$ and $r$ are then equal to each other. Under these conditions, the differential amplifier AD supplies to its output channel A a signal resulting from the algebraic subtraction of the signals $x$ and $z$, possibly having assigned to them coefficients due to the presence of the attenuators F. If one of these attenuators reverses the sign of the signals, channel A supplies a signal resulting from the algebraic addition of the signals $x$ and $z$. More generally, the channel A (taking into account possibly the attenuator F of this channel) carries a signal $a = k{\cdot}x + m{\cdot}z$, $k$ and $m$ being any coefficients in absolute value and sign, but predetermined by the characteristics of the electronic circuitry. Similarly, on the channel B there will be found a signal $b = l{\cdot}y + n{\cdot}z$, $l$ and $n$ being also any values whatsoever but predetermined. The curve tracer T receives and translates the signals a and b graphically into abscissae and ordinates, respectively. As explained in the foregoing, the signals $x$, $y$ and $z$ are therefore each represented along a graphical axis, $x$ in abscissae and $y$ in ordinates, $z$ along an axis passing through the point of origin at the intersection of the two preceding axes and, relative to the latter, directed along a fixed direction determined by the value of the ratio $m / n$, as is known in cartesian geometry.

Figure 3:
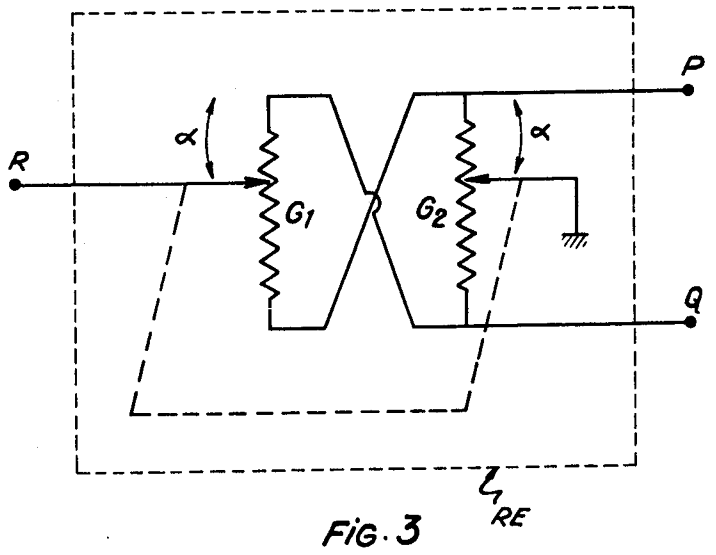
FIG. 3 shows an electric circuit diagram of a second embodiment of the distributing device RE.

Another embodiment of the distributing device RE, shown in FIG. 3, comprises two identical slider-potentiometers $G_1$ and $G_2$, connected in parallel with reversal of direction. The sliders of these potentiometers are coupled together mechanically, their movement being controlled by external manual or mechanical action. The signal $r$ is thus divided into two signals $p$ and $q$ according to the equation $r = p + q$, the ratio $p/q = \alpha$being determined by the position of the sliders. Under these conditions, a signal $z$ is represented on an axis passing through the origin, and directed relative to the axes of the abscissae and co-ordinates along a direction determined by the value of the ratio $\alpha{\cdot}\ m\ (1 - \alpha)\ {\cdot}n$, this direction being a function of $\alpha$and therefore varying according to the wishes of the operator. However, the $z$ axis remains always in the same quadrant of the $x$ and $y$ axes, unless the operator makes a change of sign of the signals $p$ and/or $q$ by acting on the corresponding attenuators F.

In a modification, the potentiometers $G_1$ and $G_2$, provided with continuous movement sliders, may be replaced by discontinuous variation potentiometers, constructed for example of a set of suitably connected resistors and switches. In this modification, it is possible to associate with the switches a control of the sign of the signals $p$ and $q$, so as to provide a control of the position of the z axis, whereby this axis may be located at the operator's choice in each of the four quadrants, but only in a discrete number of orientations.

Figure 4:
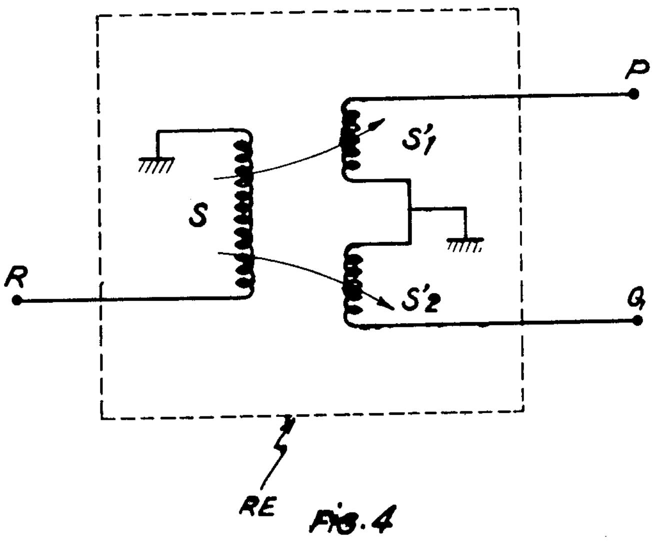
FIG. 4 shows an electric circuit diagram of a third embodiment of the distributing device RE.

In another embodiment of the distributing device RE, shown in FIG. 4, use is made of a transformer comprising a primary winding S and two secondary windings $S_1'$ and $S_2'$ respectively connected to the channels R, F, and Q. According to a first advantageous modification, shown in FIG. 5, this transformer is constituted by a two-phase selsyn, the winding S of the rotor serving as primary winding. The amplitude of the signals $p$ and $q$ induced in the windings $S_1'$ and $S_2'$ of the stator by the signal *in the* injected in the winding S of the rotor varies as a function of the position of the rotor, $p$ and $q$ satisfying the equation $p^2 + q^2 =$ (constant, proportional to $r^2$); furthermore, the phases of $p$ and $q$ are reversed at each half-revolution of the rotor each time the peak amplitude of the signal $p$ and $q$ is reduced to zero. The signal $z$ is thus decomposed into two signals $p$ and $q$ which are then directed towards the channels A and B, such that the channels A and B supply to the curve tracer signals $a = k{\cdot}x + m{\cdot}z$ and $b = l{\cdot}y + n{\cdot}z$; the coefficients $m$ and $n$ have a value and sign depending on the position of the selsyn rotor, while satisfying the equation of an ellipse or a circle. Under these conditions, the $z$ axis on the graphical representation assumes a direction which is a function of the position of the selsyn rotor; by driving this rotor manually or mechanically, the $z$ axis may be rotated continuously around the origin and relative to the axes of the abscissae and ordinates. It is thus possible to represent graphically known phenomena by their polar co-ordinates; as example of the application of this representation, the study of the dynamic balancing of rotating objects may be mentioned.

Figure 6:
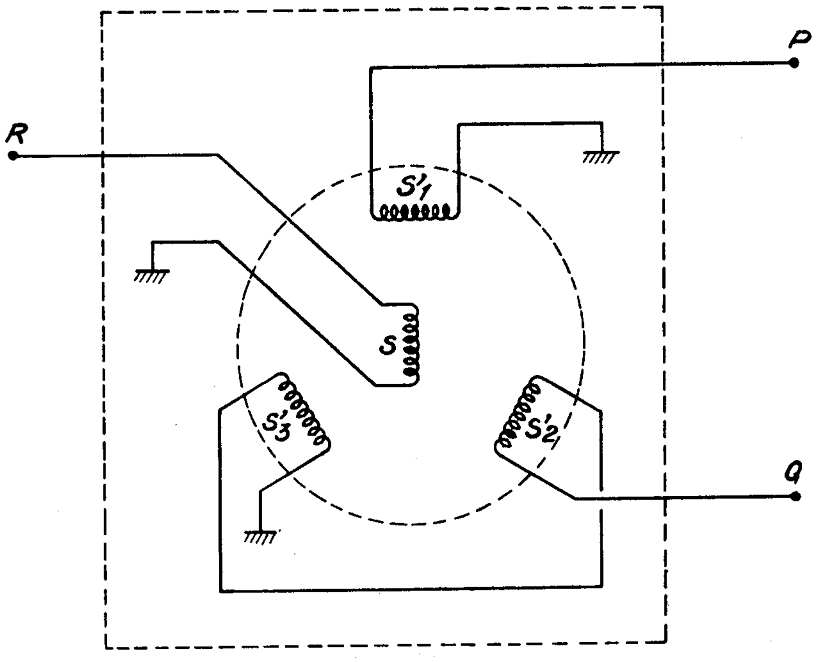
FIG. 6 shows an embodiment example of the electric circuit of FIG. 4 using a three-phase "selsyn;"

According to a second advantageous modification, shown in FIG. 6, the transformer is constituted by a three-phase selsyn, the winding S of the rotor serving as primary winding, the windings $S_1'$, $S_2'$ and $S_3'$ of the stator being connected in such a manner as to provide, for example by means of a resistance bridge as shown in FIG. 6, two signals $p$ and $q$ satisfying the equation of an ellipse when a signal $r$ is supplied to the winding S. If the signals $p$ and $q$ are to be made equal in absolute value, it is necessary to act on the attenuators F of the channels P and Q, as a vectorial diagram will readily show to the person versed in the art. In a graphical representation given by the curve tracer, the $z$ axis obtained assumes a direction varying as a function of the selsyn rotor as in the two-phase selsyn.

Figure 8:
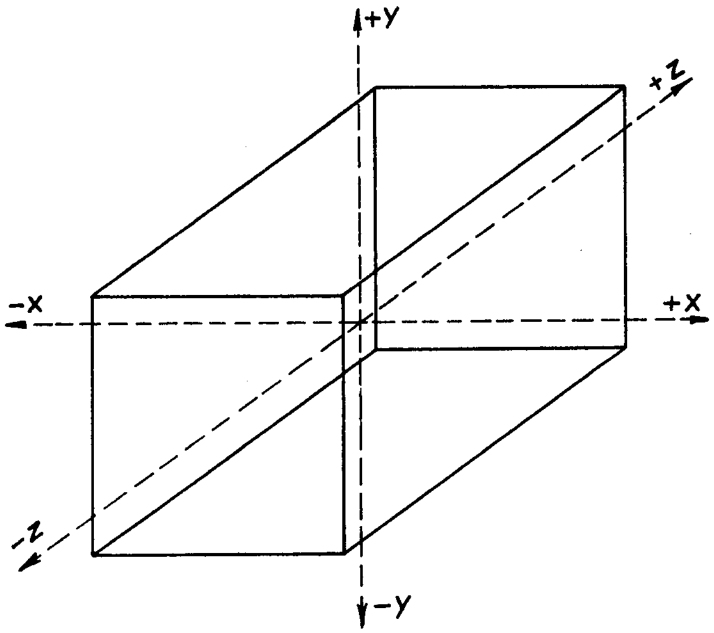
FIG. 8 is an illustration of the graphical representation according to the invention, showing the perspective effect.
Figure 7:
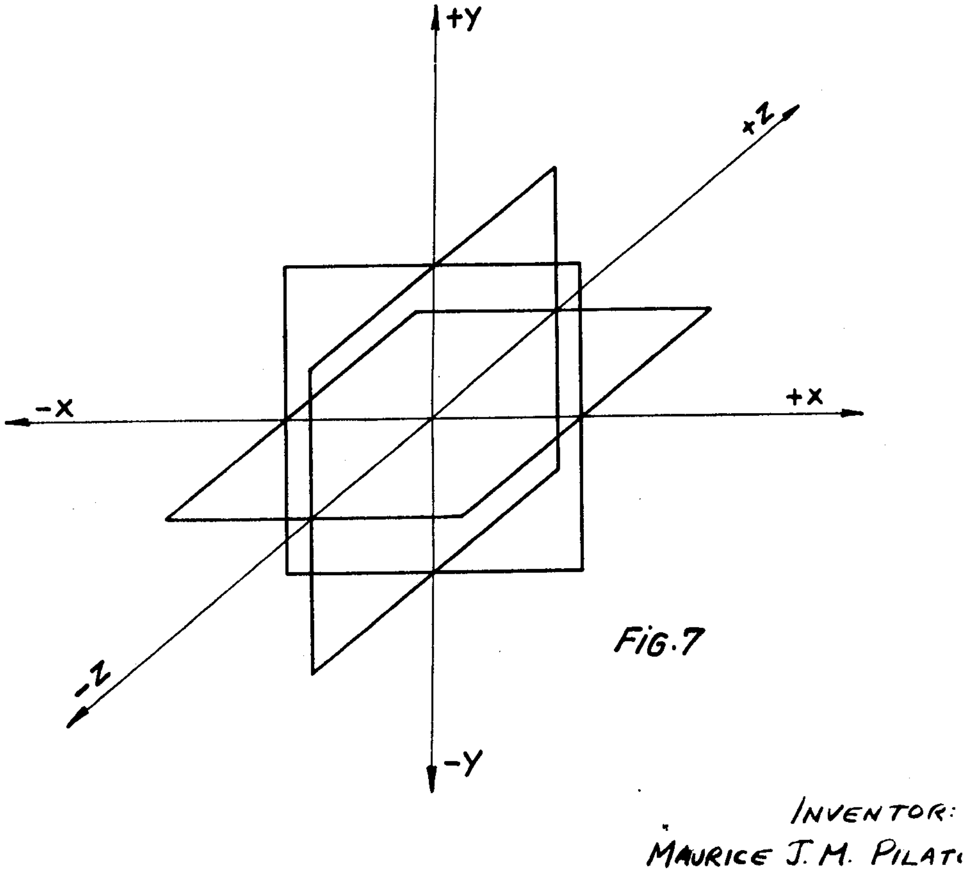
FIG. 7 is an illustration of the graphical representation according to the invention.

FIG. 7 and 8 illustrate the plane graphical representation of three electrical signals, according to the invention. To each of the signals $x$, $y$ and $z$ supplied to the input channels X, Y and Z of the device according to the invention, there corresponds a co-ordinate axis of the diagram, i.e., respectively X, Y and Z, having an orientation and a scale. In the examples shown, the axes X and Y are perpendicular to each other and oriented to represent axes of the abscissae and ordinates in the usual manner. The Z axis is a straight line passing through the origin (point of intersection of the X and Y axes) and having an orientation and angular position selected by the operator to conform to the usual manner of representing objects in isometric perspective.

The X, Y and Z axes shown in FIG. 7 may be traced by applying any signal, preferably sinusoidal, to the corresponding input channel of the device. The planes formed by its axes taken two at a time may be visualized successively by applying to the two corresponding input channels of the device signals whose combination forms a Lissajous figure; there are thus obtained successively a rectangle and two parallelograms, such as are shown in FIG. 7 (in this figure, since the signals are substantially equal, the rectangle is approximately a square).

Figure 5:
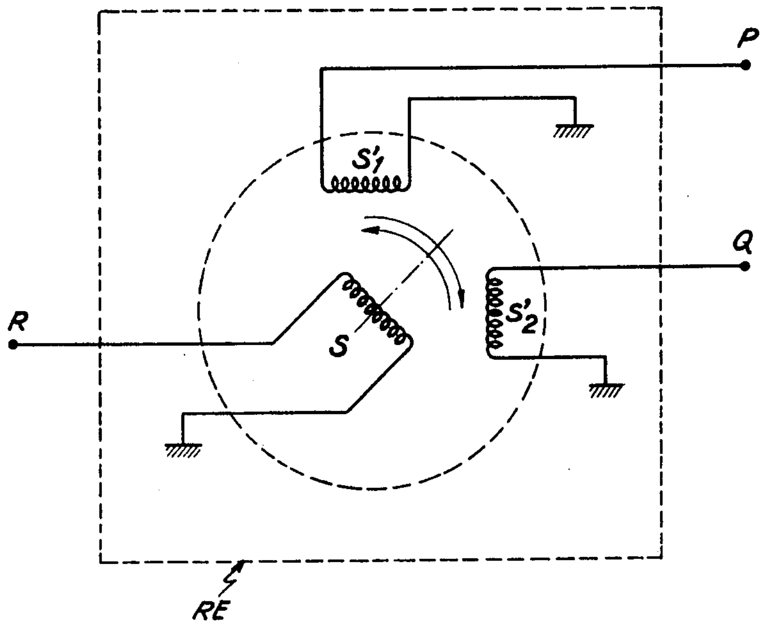
FIG. 5 shows an embodiment example of the electric circuit of FIG. 4 using a two-phase "selsyn;"

By applying simultaneously three signals such as in the foregoing, to the three input channels of the device, the graphical representation shown in FIG. 8 is obtained, suggesting a right prism seen in isometric perspective. The illusion of perspective becomes still much better if the operator modifies the diagram by rotating or oscillating the Z axes about the origin by an action of the appropriate controls, for example the axis of rotation of the selsyn if the device according to FIG. 5 or 6 is used.

Figure 9:
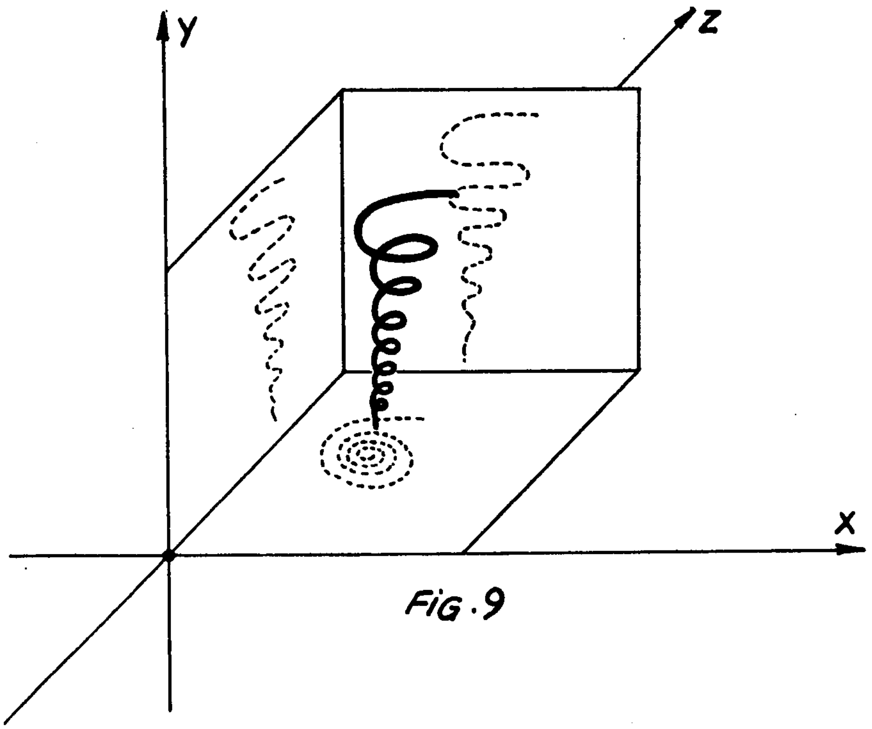
FIG. 9 is an example of the direct graphical representation of the trajectory of a point.

FIG. 9 illustrates an example of direct graphical representation of the trajectory of a point. The three co-ordinates of the center of gravity of an object are converted into electrical signals applied to the device according to the invention, such that the curve tracer indicates at any moment the position of this point relative to a reference trihedron seen in isometric perspective. The use of a tracing table of an oscillograph having an after-glow screen permits the trace of the trajectory to be retained, and a visualization in perspective to be obtained. Of course, the co-ordinates of the material point, of which the trajectograph is being made, may be either real co-ordinates obtained by telemetering, or co-ordinates calculated in a simulation study.

Figure 10:
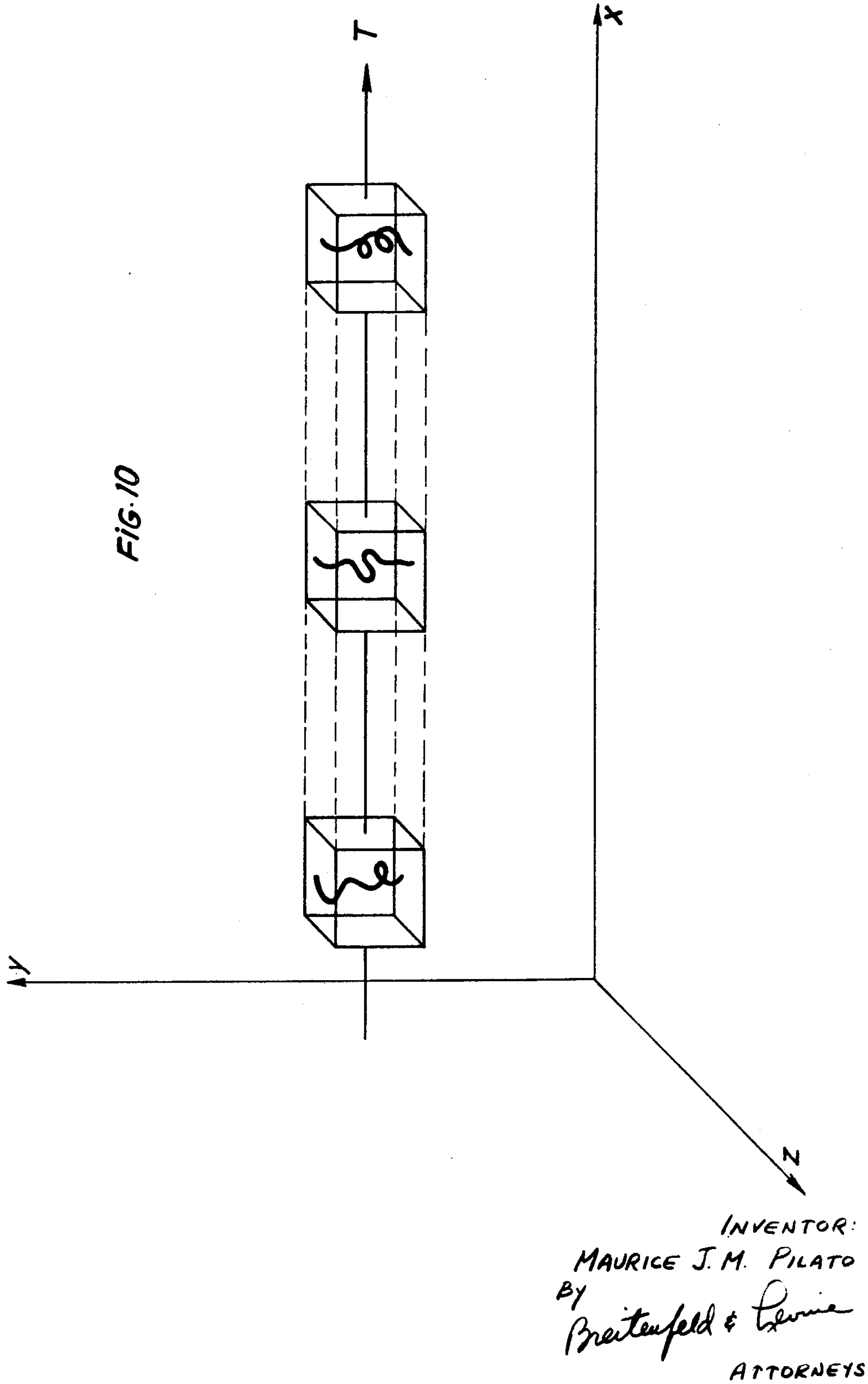
FIG. 10 is an example of the direct graphical representation of the trajectory of a point showing also the evolution of this trajectory as a function of another parameter.

When a trajectory, such as that of FIG. 9, evolves for example as a function of time, it is possible to visualize the successive aspects of the trajectory by displacement of the the origin of the co-ordinates in successive steps. In FIG. 10, the origin of the co-ordinates has thus been displaced along the X axis in successive jumps to produce trajectories shown side by side, as illustrated by the figure, by adding to the signals, supplied by the X channel, constant voltages, stepped in increasing values from one trajectory to the other.

Figure 11:
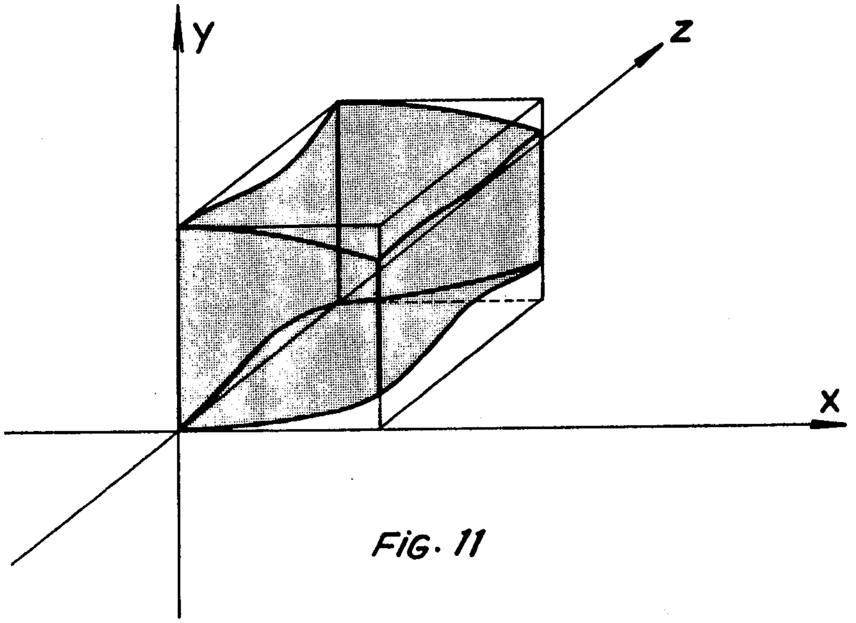
FIG. 11 is an illustration of another form of graphical representation according to the invention by modulation of signal carriers.

FIG. 11 illustrates an example of parameter representation by modulation of carrier signals. In the absence of parameters to be represented, the carrier signals are recorded on the screen by producing the appearance of a right prism, seen in isometric perspective. The signals corresponding to the parameters studied deform this prism, for example as shown in the figure.

As already mentioned, this form of representation offers the advantage of a better presentation of certain variations of the signals as functions of one another. In addition, in some cases, a relationship may be established between the figure appearing on the screen and the real phenomenon studied. For example, in the case of studies of mechanical stresses and strains it is possible to establish a correspondence between the deformations of a studied solid of prismatic form and the prismatic figure on the screen; by suitable choice of the amplification coefficients, the figure may simulate for the operator a direct vision of the deformations of the solid. This possibility is extremely advantageous in its applications to architecture or to building and public works, among other examples.

A modification of this mode of representation, more particularly applicable to trajectography, consists in the representation of a trajectory of an object by a band, the width and orientation of which provide indications of the attitude of the object in space.

In a general manner, the invention is applied to the representation of any quantities which can be translated into electrical signals and the variations of which, as a function of each other, it is useful to know.

I claim:

1. An electronic device comprising a signal distributor, three inputs for supplying three electrical input signals to said distributor, two outputs for receiving first and second electrical output signals from said distributor, and a curve tracer for receiving said output signals from said outputs and producing a graphical representation of them along cartesian coordinates, said signal distributor comprising two identical differential amplifiers and a distributing device, each of said amplifiers having a pair of symmetrical input channels and an output channel, and said distributing device having an input channel and a pair of output channels, each output channel of said distributing device being connected to one of the input channels of a different one of said amplifiers, said distributing device supplying to each of its output channels a signal proportional to the signal received at its input channel.

2. A device according to claim 1, in which the two output channels and the input channel of the distributing device are connected directly together.

3. A device according to claim 1, in which the distributing device comprises two identical slider-potentiometers, connected in parallel by their two ends, the input channel of the distributing device corresponding to the two sliders, and one of the two output channels of the distributing device corresponding to one of the ends common to the two potentiometers and to one of the sliders, the other to the same slider and to the other end common to the two potentiometers, the two sliders being coupled together for simultaneous actuation, each in the appropriate direction, either manually or mechanically.

4. A device according to claim 1 in which the distributing device comprises a transformer having a primary including at least one primary winding and a secondary including at least two secondary windings, one at least of the primary windings corresponding to the input channel of the distributing device and two at least of the secondary windings corresponding each to an output channel of the distributing device.

5. A device according to claim 4, in which the relative arrangement of the primary and of the secondary is variable by mechanical translation or rotation of one of the primary and secondary relative to the other.

6. A device according to claim 5, in which the transformer includes a selsyn comprising a rotor and a stator, each provided with at least one winding, the winding of the rotor and the winding of the stator corresponding one to the primary of the transformer and the other to the secondary of the transformer.

7. An electronic device comprising a signal distributor, three inputs for supplying three electrical input signals to said distributor, and two outputs for receiving first and second electrical output signals from said distributor, said signal distributor comprising two identical differential amplifiers and a distributing device, each of said amplifiers having a pair of symmetrical input channels and an output channel, and said distributing device having an input channel and a pair of output channels, each output channel of said distributing device being connected to one of the input channels of a different one of said amplifiers, said distributing device supplying to each of its output channels a signal proportional to the signal received at its input channel.

8. A device according to claim 7 in which the two output channels and the input channel of the distributing device are connected directly together.

9. A device according to 7, 7 in which the distributing device comprises two identical slider potentiometers, connected in parallel by their two ends, the input channel of the distributing device corresponding to the two sliders, and the two output channels of the distributing device corresponding one to one of the ends common to the two potentiometers and to one of the sliders, the other to the same slider and to the other end common to the two potentiometers, the two sliders being coupled together, each in the appropriate direction, either manually or mechanically.

10. A device according to claim 7, in which the distributing device comprises a transformer having a primary including at least one primary winding and a secondary including at least two secondary windings, one at least of the primary windings corresponding to the input channel of the distributing device, and two at least of the secondary windings each corresponding to an output channel of the distributing device.

11. A device according to claim 10, in which the relative arrangement of the primary and of the secondary is variable by mechanical translation or rotation of one primary and secondary relative to the other.

12. A device according to claim 11, in which the transformer consists of a selsyn having a rotor and stator, each provided with at least one winding, the winding of the rotor and the winding of the stator corresponding one to the transformer primary, and the other to the transformer secondary.

13. Signal distributing apparatus for transforming at least three input analog signals, the amplitude of each of which corresponds to a value of a respective independent input parameter, into two output corrdinate signals for a representation in a two axis coordinate system, including at least three distributor input means receiving the said input signals, two distributor output means supplying the said output signals, first signals combining means coupling two of the input means to one of the output means, and second signal combining means coupling another two of the input means to the other output means, each of said signal combining means including differential amplifier means.

14. Apparatus as claimed in claim 13, wherein at least one of said input means is coupled to a respective differential input of each of said differential amplifier means.

15. Apparatus as claimed in claim 14, wherein said one of said input means includes a selsyn.

* * * * *